(12) United States Patent
Hnatovsky et al.

(10) Patent No.: US 12,259,296 B2
(45) Date of Patent: Mar. 25, 2025

(54) APPARATUS, METHOD AND SYSTEM FOR DETECTING PRESENCE OF A FLUID

(71) Applicant: NATIONAL RESEARCH COUNCIL OF CANADA, Ottawa (CA)

(72) Inventors: Cyril Hnatovsky, Ottawa (CA); Dan Grobnic, Ottawa (CA); Stephen Mihailov, Kanata (CA); Ping Lu, Stittsville (CA); Kasthuri De Silva, Milton (CA); Huimin Ding, Nepean (CA); David Coulas, Greely (CA); Robert Walker, Spencerville (CA)

(73) Assignee: NATIONAL RESEARCH COUNCIL OF CANADA, Ottawa (CA)

( * ) Notice: Subject to any disclaimer, the term of this patent is extended or adjusted under 35 U.S.C. 154(b) by 707 days.

(21) Appl. No.: 17/432,709

(22) PCT Filed: Jan. 10, 2020

(86) PCT No.: PCT/IB2020/050187
§ 371 (c)(1),
(2) Date: Aug. 20, 2021

(87) PCT Pub. No.: WO2020/170047
PCT Pub. Date: Aug. 27, 2020

(65) Prior Publication Data
US 2022/0196508 A1 Jun. 23, 2022

Related U.S. Application Data

(60) Provisional application No. 62/809,092, filed on Feb. 22, 2019.

(51) Int. Cl.
*G01M 3/04* (2006.01)
(52) U.S. Cl.
CPC .................... *G01M 3/04* (2013.01)

(58) Field of Classification Search
CPC ......................................................... G01M 3/04
See application file for complete search history.

(56) References Cited

U.S. PATENT DOCUMENTS

| | | |
|---|---|---|
| 4,807,950 A | 2/1989 | Glenn et al. |
| 4,834,496 A | 5/1989 | Blyler, Jr. et al. |
| (Continued) | | |

FOREIGN PATENT DOCUMENTS

| | | | |
|---|---|---|---|
| CA | 3014508 A1 | 8/2017 | |
| DE | 19807891 | * | 8/1999 |
| (Continued) | | | |

OTHER PUBLICATIONS

ISA/CA, International Search Report and Written Opinion, Mar. 26, 2020, re PCT International Patent Application No. PCT/IB2020/050187.

(Continued)

*Primary Examiner* — Jamel E Williams
*Assistant Examiner* — Alex T Devito
(74) *Attorney, Agent, or Firm* — PERRY + CURRIER INC.

(57) ABSTRACT

An apparatus, method and system are set forth for detection of fluids using Bragg grating sensors, wherein the Bragg grating sensing element comprises an optical fiber having a Bragg grating inscribed therein characterized by optical properties that are dependent upon the periodicity and effective refractive index of the grating, and a package for subjecting the Bragg grating to a change in strain when contacted by a fluid such that periodicity and effective refractive index of the grating changes, whereby when interrogated with laser light any such change in periodicity and effective refractive index may be detected.

4 Claims, 8 Drawing Sheets

(56) References Cited

U.S. PATENT DOCUMENTS

| | | |
|---|---|---|
| 5,187,366 A | 2/1993 | Hopenfeld |
| 5,287,427 A | 2/1994 | Atkins et al. |
| 5,367,588 A | 11/1994 | Hill et al. |
| 5,400,422 A | 3/1995 | Askins et al. |
| 5,567,622 A | 10/1996 | Jaduszliwer et al. |
| 6,297,894 B1 * | 10/2001 | Miller .................. G03H 1/0248 359/30 |
| 6,753,520 B2 | 6/2004 | Spirin et al. |
| 6,878,900 B2 | 4/2005 | Corkum et al. |
| 6,884,960 B2 | 4/2005 | Bourne et al. |
| 6,993,221 B2 | 1/2006 | Mihailov et al. |
| 7,031,571 B2 | 4/2006 | Mihailov et al. |
| 7,033,519 B2 | 4/2006 | Taylor et al. |
| 7,379,643 B2 | 5/2008 | Mihailov et al. |
| 7,438,824 B2 | 10/2008 | Taylor et al. |
| 7,483,615 B2 | 1/2009 | Mihailov et al. |
| 7,515,792 B2 | 4/2009 | Mihailov et al. |
| 7,606,452 B2 | 10/2009 | Bilodeau et al. |
| 7,689,087 B2 | 3/2010 | Mihailov et al. |
| 7,792,392 B2 | 9/2010 | Chen et al. |
| 8,272,236 B2 | 9/2012 | Smelser et al. |
| 8,402,789 B2 | 3/2013 | Smelser et al. |
| 8,640,527 B2 | 2/2014 | Hara |
| 8,727,613 B2 | 5/2014 | Mihailov |
| 9,400,269 B2 | 7/2016 | Kambhampati et al. |
| 9,677,957 B2 | 6/2017 | Dong et al. |
| 10,156,680 B2 | 12/2018 | Grobnic et al. |
| 2004/0067003 A1 | 4/2004 | Chiliaguine et al. |
| 2004/0228594 A1 | 11/2004 | Andre et al. |
| 2007/0075225 A1 | 4/2007 | Xia et al. |
| 2014/0152995 A1 | 6/2014 | Dong et al. |
| 2017/0138862 A1 | 5/2017 | Boersma et al. |
| 2018/0067254 A1 | 3/2018 | Mihailov et al. |
| 2018/0120267 A1 | 5/2018 | Wang et al. |
| 2018/0252555 A1 | 9/2018 | LeBlanc et al. |
| 2019/0049272 A1 | 2/2019 | Grobnic et al. |

FOREIGN PATENT DOCUMENTS

| | | | |
|---|---|---|---|
| EP | 0505581 A1 | 9/1992 | |
| WO | WO-9915858 A1 * | 4/1999 | ......... G01D 5/35312 |
| WO | WO-2007087720 A1 | 8/2007 | |
| WO | WO-2009070769 A1 | 6/2009 | |
| WO | WO-2017141188 A1 | 8/2017 | |
| WO | WO-2019165562 A1 | 9/2019 | |

OTHER PUBLICATIONS

Spirin, V. V., et al. "Fiber Bragg grating sensor for petroleum hydrocarbon leak detection." Optics and Lasers in Engineering 32.5 (1999): 497-503. [Abstract Only].

Bernier, M., et al. "High mechanical strength fiber Bragg gratings made with infrared femtosecond pulses and a phase mask." Optics letters 39.12 (2014): 3646-3649.

Chao, Lu et al. "Grating writing through fibre coating at 244 and 248 nm." Electronics Letters 35.11 (1999): 924-926.

Smelser, Christopher W et al. "Formation of Type I-IR and Type II-IR gratings with an ultrafast IR laser and a phase mask." Optics express 13.14 (2005): 5377-5386.

Froggatt, Mark. "High density strain sensing using optical frequency domain reflectometry." Fourteenth International Conference on Optical Fiber Sensors. vol. 4185. SPIE, 2000.

Nam, Changwoo, et al. "Petrogel: new hydrocarbon (oil) absorbent based on polyolefin polymers." Macromolecules 49.15 (2016): 5427-5437.

PCT/IB2020/050187, Apparatus, Method and System for Detecting Presence of a Fluid, Jan. 10, 2020.

* cited by examiner

APPARATUS, METHOD AND SYSTEM FOR DETECTING PRESENCE OF A FLUID

FILED OF THE INVENTION

The present invention relates to detecting fluids, and more particular to an apparatus, method and system for detection of fluids using Bragg grating sensors. One contemplated application is detection of oil and gas leaks in pipelines.

BACKGROUND OF THE INVENTION

Although pipelines are one of the safest methods for the transportation of petroleum products, failures resulting in leaks and spills put the safety of the public and the environment at risk. Conventional leak detection systems (LDS) can be divided into three groups: visual inspection/observation, internal instrumentation, and external instrumentation. Simple visual observation is reliable and is part of every pipeline patrolling and monitoring program. However, visual observation cannot ensure timely detection of leaks especially when pipelines traverse remote locations.

There are many different leak detection instrumentation technologies, however operators have a strong preference for systems that utilizes field equipment that is already in place. The most commonly used approach to leak detection uses existing Supervisory Control and Data Acquisition (SCADA) systems to monitor pipeline pressures and flows. These internal systems typically consist of computers and sensors located at pump and compressor stations along the pipeline network for providing real-time information such as line pressure, temperature, volume and product flow, valve status, etc. SCADA systems allows a pipeline operator to monitor and control all key operations from a central location. This approach, however, is only successful in detecting major leaks a small percentage of leakage events.

Petroleum products escaping from a pipeline contaminate soil and groundwater while gas can cause explosions and is harmful to the atmosphere. Therefore, external leak detection systems need to be able to detect even small leakages with high spatial resolution. Fiber optic LDS systems are typically based on distributed temperature sensing (DTS) or distributed acoustic sensing (DAS) techniques where light scattering properties of an optical fiber (Rayeigh, Brillouin or Raman) are used to make distributed measurements of strain or temperature along the length of the optical fiber using phase optical time domain reflectometry (Φ-OTDR) or optical frequency domain reflectometry (OFDR). Leaking oil (or other products) causes a temperature change below the pipeline that can be detected by installing the optical fiber in proximity and parallel to the pipe.

DAS techniques acoustically detect leaks that may occur based on an acoustic signature associated with, for example, a high-pressure leak. Fiber optic monitoring systems based on these approaches are available from a large number of international suppliers, for example Avantes B.V. (The Netherlands), Baumer Group (Switzerland), Cementys (France), Haliburton (USA), Hi Fi (Canada), Honeywell International Inc. 35 (USA), Intelligent Fiber Optics Systems Corp. (USA), Northrop Grumman Corporation (USA), Schlumberger Limited (USA), FISO Technologies Inc. (USA), Silixa (UK), Prime Photonics (USA), Sensornet Ltd. (UK), Weatherford International Ltd. (USA), Foxtek (Canada), Zeibel AS (Norway). Because of the low signal to noise ratio of QTS and DAS measurement, large numbers of measurements are required in order to detect events that are statistically relevant, thereby generating large amounts of data to be processed, while also generating a large number of false positives.

An alternative fiber optic sensor approach is to measure the presence of hydrocarbons directly. Using techniques disclosed by Blyler et al. in U.S. Pat. No. 4,834,496, a fiber optic chemical sensor (FOGS) utilizes a multimode optical fiber that is coated with a material that reacts when exposed to hydrocarbons. The presence of hydrocarbons on the coating causes an increase in index of refraction of the coating, thereby increasing the amount of light lost through the optical fiber. This approach is effective for use as a point sensor and has been commercialized for example by FCI Environmental, Inc of Las Vegas, Nev. The disadvantage of this approach is that it is costly and the stability of the chemically sensitive coating of the fiber can decrease over time.

For distributed sensing, the technique of optical time domain reflectometry (OTDR) can be applied to a single fiber with multiple sensing locations by observing the change in fiber loss as a function of position, as taught by Jaduszliwer et al. in U.S. Pat. No. 5,567,622. As with the ITS and DAS techniques described above, a large number of measurements are required in order to detect events that are statistically relevant thus generating large amounts of data to be processed. These techniques also generate many false positives.

Another fiber optic sensing approach is taught by J. Hopenfeld in U.S. Pat. No. 5,187,366, wherein separated sections of optical fiber are coupled together via elastomer or rubber fixtures under strain which, when exposed to, for example, gasoline, result in a relaxation of tension of the fixture causing a misalignment of the coupled optical fibers. This misalignment may then be detected as a signal loss of the optical source at the detector. This approach is effective as a trigger-based switch point sensor, however sensing locations beyond the triggered sensor is not possible or practical when multiple/hundreds of sensing points are required.

A further fiber optic approach to measuring pipeline leaks is taught by E. H. Hara in U.S. Pat. No. 8,640,527. In the '527 patent, an optical fiber is coiled around a pipeline. Along the fiber length, stressed coiled springs are embedded in a material that is frangible when exposed to a hydrocarbon. When the material degrades upon exposure the stressed coil is released thereby applying a strain to the optical fiber which is detected using a time domain sensing approach, such as Φ-OTDR.

Fiber Bragg grating (FBG) sensors are attractive devices for performing quasi-distributed temperature and strain measurements along an optical waveguide (e.g. optical fiber). Variations in the spectral response of the grating result from period and the effective refractive index (net) changes in the Bragg grating due to strains or temperature variations that are experienced by the optical fiber when placed in a specific environment. These FBG sensors offer important advantages over other sensor technologies because of their electrically passive operation, electromagnetic interference (EMI) immunity, high sensitivity and multiplexing capabilities. FBGs are simple, intrinsic sensing elements that, traditionally, have been UV photo-inscribed into photosensitive single mode germanium (Ge)-doped silica fiber. Each FBG sensor has a characteristic retro-reflective Bragg resonance or Bragg resonance wavelength, which is dependent upon the periodicity of the grating photo-inscribed within the fiber and the effective refractive index $n_{eff}$ of the fundamental core mode of the optical fiber. The FBG sensors can be easily multiplexed in a serial fashion along a length of single fiber to produce a quasi-distributed optical fiber sensor array.

Currently, wavelength division multiplexing (WDM) and time-division-multiplexing (TDM) are two methods by which individual grating sensors along an optical fiber array may be discriminated. For the WDM method, each grating sensor has a high reflectivity (>50%) and a discrete Bragg resonance. An advantage of this approach is high signal to noise ratio in the measurement. A drawback to the approach is that the maximum number of sensors that can be placed along an optical fiber is limited by the ratio of the bandwidth of the interrogator, which is typically less than 100 nm, to the dynamic wavelength range of each individual grating sensor, typically a few nanometers. This limits the number of sensing elements along a fiber to a few dozen. For the TDM approach, the gratings typically are identical in wavelength and have reflectivities <0.1% (see Froggatt et al. in Proc. SPIE 4185 p249-255 (2000), which uses OFDR to interrogate the sensors). A limitation of the TDM OFDR approach is that the maximum length of fiber that can be interrogated is only a couple of hundred meters and is dependent on the coherence length of the probing laser. Dong et al. in U.S. Pat. 9,677,957 discloses an interrogation method that is a combination of the WDM and TDM techniques, that is referred to as wavelength scanning time division multiplexing (WSTDM). In this approach, a pulsed tunable laser source interrogates up to 1000 gratings having identical Bragg resonances and weak reflectivities <0.1%. Wavelength shifts of the resonances due to, for example, temperature or strain are determined by sweeping the interrogation laser wavelength while the identification of the grating location is determined by the time of flight of the interrogating laser pulse. In this fashion up to 1000 weak FBGs have been interrogated along a length of fiber that up to 10's of km in length.

Fiber Bragg gratings may be created by exposing a UV-photosensitive core of a single mode germanium doped silica optical fiber to a spatially modulated UV laser beam in order to create permanent refractive index changes in the fiber core, Such a spatially modulated UV beam can be created by using a two-beam interference technique, as disclosed in U.S. Pat. No. 4,807,950 by Glenn et al. or by using a phase mask as disclosed in U.S. Pat. No. 5,367,588 by Hill et al. The techniques taught by Glenn and Hill result in gratings that are typically referred to as Type I gratings.

Spirin et at. in Optics and Lasers in Engineering, vol. 32 pg. 497-503 (2000), disclose a technique to detect petroleum leaks using UV inscribed FBGs that are packaged in a polymeric material such as butyl rubber, which swells upon exposure to hydrocarbons. When metal plates are anchored to opposite sides of an FBG and the fiber surface about the grating is covered in the swelling polymer, exposure to hydrocarbons causes a strain on the fiber which is detected using the FBG. A variation on this approach is taught by Spirin et al in U.S. Pat. No. 6,753,520. Similar to the approach taught by Hare in the aforementioned U.S. Pat. No. 8,640,527, exposure to a hydrocarbon of a coated optical fiber results in a strain induced bending loss in the optical fiber which is detectable by FBGs that are distributed along the optical fiber.

A limitation of prior-art UV-induced Type I fiber Bragg gratings and sensors, especially for applications where the sensor undergoes high strain, is that their fabrication generally relies on methods that require removal and reapplication of polymer coatings that protect the optical fiber. Most optical fibers have UV-absorbing protective polymer coatings such as acrylate or polyimide which need to be removed before the UV laser light can induce a periodic index change along the length of the fiber for creating the Bragg crating. The coating removal and its reapplication, aside from being labor intensive and time-consuming, significantly weakens the mechanical strength of the fiber unless special precautions are taken. It is preferable that the strip and recoat processes be entirely avoided. Special UV-transmissive fiber coatings have been demonstrated in order to perform through-the-coating (TTC) inscription of UV-laser based FBGs, for example as described by L. Chao et al. in Electronic Letters 35, p.924-926 (1999) where a grating is written in a highly UV-photosensitive fibre through a silicone rubber coating. Silicone rubber coatings are not typically used for fibre optics as they are difficult to remove from fibres when preparing their ends for integration into network systems. This difficulty in handling is the major reason why silicone rubber coatings are no longer used on standard fibres. The use of specialty fibre coatings is undesirable from an industrial FBG manufacturing perspective as custom fibre designs and coatings are inherently more expensive.

To bypass the necessity of stripping the optical fiber before UV grating inscription, Askins et al in U.S. Pat. No. 5,400,422 teach a method of inscribing gratings while the fiber is being pulled on the draw tower but before the fiber is coated. Using holographic exposure and a single high energy UV pulse, a high reflectivity, high thermal stability grating can be written on the fly. By reducing the pulse energy, it is possible to write low reflectivity Type I gratings. However, a serious disadvantage of this approach is the necessity to have a fiber draw tower in order to manufacture an optical fiber grating or fiber grating array.

A limitation of these prior-art UV laser fabricated FBG sensors is that they rely on several processing steps that are time consuming and can potentially degrade the integrity of the optical fiber, thereby reducing the yield of the manufactured FBGs. The prior art approaches are required to use single mode Ge-doped optical fibers, to hydrogen load for increasing fiber photosensitivity (as taught by Atkins et al. in U.S. Pat. No. 5,287,427), to strip the fibers of their protective polymer coatings and then to reapply them after FBG inscription. Mihailov et al. in US. Pat. No. 6,993,221 and US. Pat. No. 7,031,571 (both of which are herein incorporated by reference) teach methods of fabrication of FBGs using high power ultrafast pulse duration radiation and a phase mask. By using infrared femtosecond duration laser pulses, gratings can be written in the cores of non-UV photosensitive as well as photosensitive fibers directly through protective polymer coatings without the necessity for hydrogen loading. The methodology of Mihailov et al, is not limited to specialty optical fibers but can be applied to optical fibers that are readily commercially available. The mechanism by which index change is induced in the fiber is not one of linear absorption of high energy UV photons but rather nonlinear absorption of lower energy infrared photons. For Ge-doped silica optical fibers, Smelser et al. have shown, in Opt. Express., vol. 13, pp. 5377-5386, 2005, that two kinds of Bragg gratings can be formed that are dependent on the intensity of the irradiating beam at the optical fiber surface. Above an intensity threshold $I_{th}=2\times10^{13}$ W/cm$^2$, gratings similar to Type I UV laser induced gratings are created. When using multiple irradiating femtosecond infrared (fs-IR) laser pulses with beam intensities greater than $I_{th}=4\times10^{13}$ W/cm$^2$ at the surface of the optical fiber, the formation of thermally stable Bragg gratings similar to Type II UV-induced gratings was observed. Type II fs-IR induced gratings are based on micro-disruptions in the optical fiber, which reduce the mechanical strength and integrity of the optical fiber. Using the techniques taught by Mihailov et al in U.S. Pat. No. 7,031,571, Bernier et al demonstrated in Opt. Lett. 39 (12), 3646 (2014) that gratings could be written though the protective polyimide coatings of pure silica core optical fibers in the Type I regime without compromising the mechanical integrity of the optical fiber.

SUMMARY OF THE INVENTION

A sensor and system are disclosed for detecting the presence of a particular fluid. In one aspect, there is provided a method for detecting presence of a fluid, comprising: mounting a sensor array proximate a conduit for said fluid, said sensor array comprising a plurality of Bragg grating sensing elements within an optical waveguide, each Bragg grating sensing element being encapsulated in a package for subjecting the Bragg grating sensing element to a change in strain when contacted by said fluid; and interrogating said sensor array with laser light to detect any change in the optical properties of the Bragg grating sensing elements due to the change in strain.

According to another aspect, there is provided a system for detecting presence of a fluid, comprising: a sensor array, said sensor array comprising a plurality of Bragg grating sensing elements, each Bragg grating sensing element being encapsulated in a package for subjecting the Bragg grating sensing element to a change in strain when contacted by said fluid; and an interrogator for pulsing said sensor array with laser light and detecting any change in the optical properties of the Bragg grating sensing elements due to the change in strain and measuring location of the changed in optical properties based on time-of-flight of the pulsed laser light being reflected at a new shifted Bragg grating wavelength.

According to an additional aspect, there is provided a fluid detecting Bragg grating sensing element, comprising: an optical fiber having a Bragg grating inscribed therein characterized by optical properties that are dependent upon the periodicity and effective refractive index of the grating; a package for subjecting the Bragg grating to a change in strain when contacted by a fluid such that periodicity and effective refractive index of the grating changes, whereby when interrogated with laser light any such change in periodicity and effective refractive index may be detected, wherein the optical fiber is connected to the package and comprises a core, a cladding and a protective polymer coating, wherein the package comprises anchors on either side of the Bragg grating, a region between the anchors being filled with a material that swells when exposed to said fluid such that the anchors constrain swelling of the material so as to apply a tensile strain to the Bragg grating sufficient to break the optical fiber.

According to a further aspect, there is provided a fluid detecting Bragg grating sensing element, comprising: an optical fiber having a Bragg grating inscribed therein characterized by optical properties that are dependent upon the periodicity and effective refractive index of the grating; a package for subjecting the Bragg grating to a change in strain when contacted by a fluid such that periodicity and effective refractive index of the grating changes, whereby when interrogated with laser light any such change in periodicity and effective refractive index may be detected, wherein the optical fiber is connected to the package and comprises a core, a cladding and a protective polymer coating, wherein the package comprises anchors on either side of the Bragg grating, a region between the anchors being filled with a material that contracts when exposed to said fluid such that the anchors conform to the contraction of the material so as to apply a compressive strain to the Bragg grating sufficient to break the optical fiber.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

As used in this specification, a fluid is a phase of matter and includes liquids, gases and plasmas. Thus, detection of fluids includes, inter alia, detection of petrochemical fluids such as oil, methane gas, etc. Also, as used in this specification, strain means, inter alia, tension, compression, torsion, shear, bending and any geometrical measure of deformation.

Figure 1A:
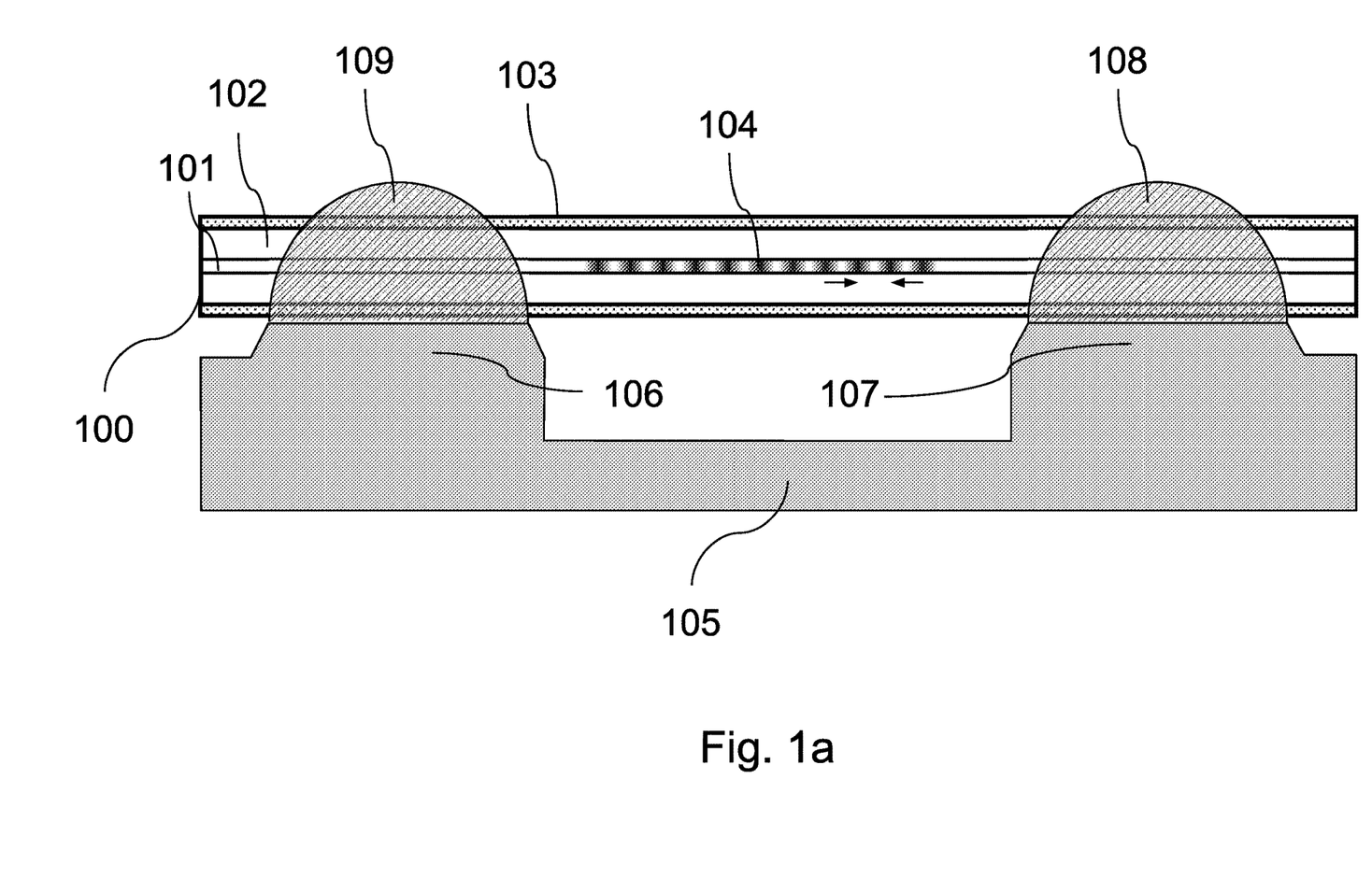
FIG. 1a is a schematic illustration of an exemplary Bragg fiber grating sensor for use in a distributed sensor array, packaged under tension with adhesives that are insoluble in water but soluble in oil.

According to an aspect of this disclosure, an array of fiber Bragg gratings (FBGs) is provided, each FBG having a different resonance wavelength inscribed through a hard protective polymer coating of an optical fiber, such as polyimide, with a femtosecond laser and a phase mask, such that the FBGs are written in the Type I regime. Each grating element is then individually mounted on a package, for example as illustrated schematically in FIG. 1a. An optical fiber 100 having a core 101, a cladding 102 and a protective polymer coating 103 containing FBG region 104, is attached to a package 105. The package has two attachment points 106 and 107. Optical fiber 100 is attached under strain to attachment points 106 and 107 using bonds 108 and 109, with FBG region 104 being disposed between the bonds. Bonds 108 and 109 are an epoxy or other adhesive that is insoluble in water but soluble in hydrocarbon-based fluids (ex. UV cured epoxy and toluene). The entire array comprises a series of n individually packaged FBG elements may be further packaged in a tube (not shown) to afford mechanical protection, wherein the tube is perforated to allow flow of fluids transversally through the tube.

Figure 1B:
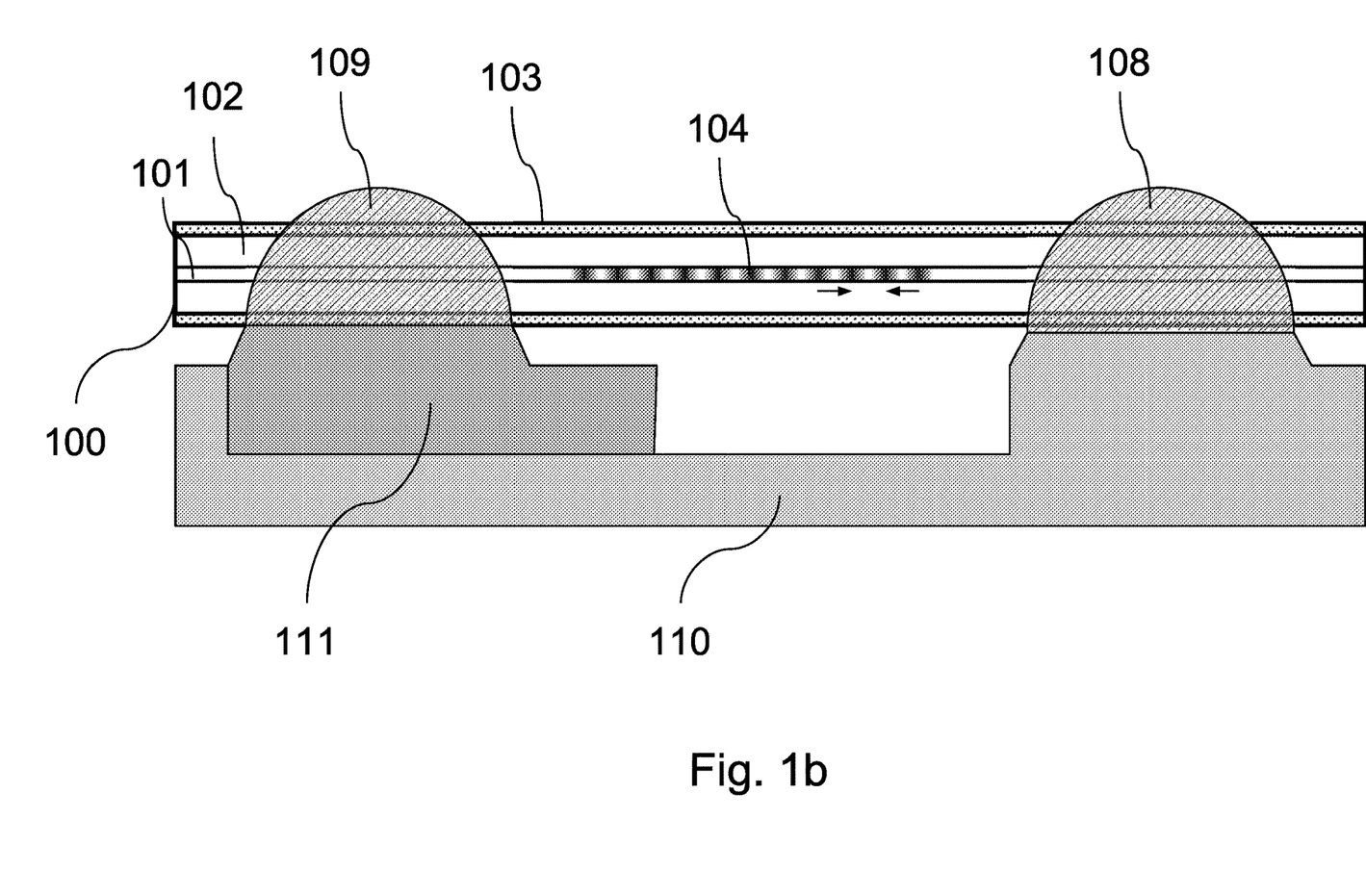
FIG. 1b is a schematic illustration of an alternative exemplary Bragg fiber grating sensor where the package is designed to compensate for variations in temperature of the environment.

Alternatively, the package can be an athermal package as depicted in FIG. 1b. The package has portions 110 and 111 that are made of different materials. Optical fiber 100 is attached under strain to portions 110 and 111 using bonds 108 and 109, with FBG region 104 being disposed between the bonds. Bonds 108 and 109 are an epoxy or other adhesive that is insoluble in water but soluble in hydrocarbon-based fluids (ex. UV cured epoxy soluble in toluene). The package is athermal, where expansion of the material portion 110 exactly counteracts the variation in strain caused by expansion of the portion 111 and the inherent temperature dependence of the FBG.

As discussed above, each FBG has a resonance wavelength and is inscribed through a protective polymer coating of the optical fiber with a femtosecond laser and a phase mask. In one embodiment, the electromagnetic radiation has a pulse duration of less than or equal to 5 picoseconds, and a characteristic wavelength in the range of from 150 nm to 2.0 microns, the electromagnetic radiation incident on the optical waveguide being sufficiently intense to cause a permanent change in an index of refraction within the core of the optical fiber (i.e. creating an interference pattern).

Figure 1C:
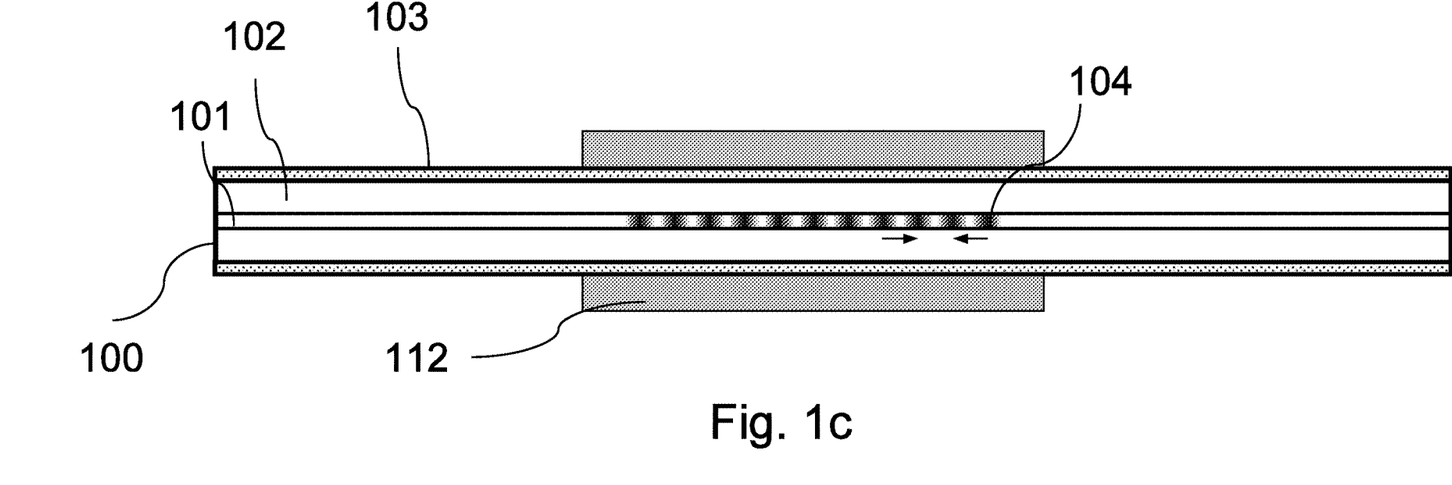
FIG. 1c is a schematic illustration of a further alternative exemplary Bragg fiber grating sensor for use in a distributed sensor array, packaged under a compressive strain rather than a tensile strain
Figure 1D:
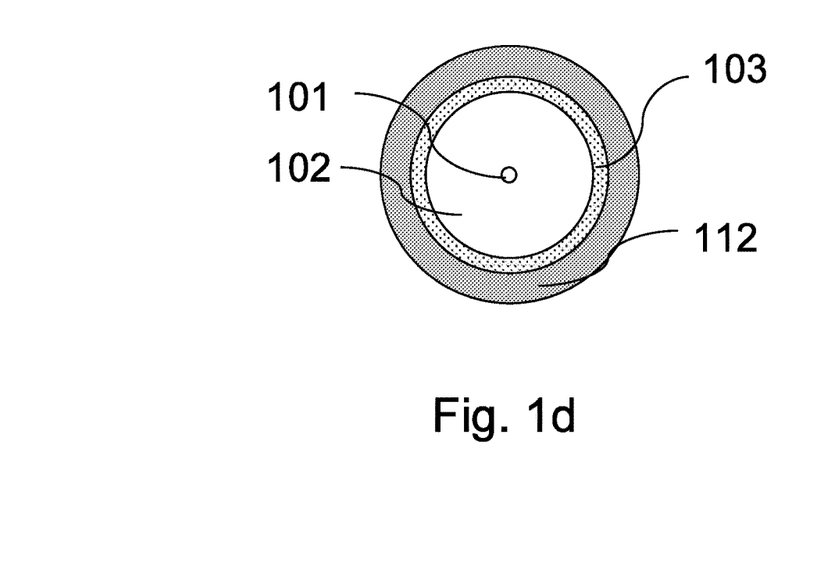
FIG. 1d is a cross-sectional view of the package depicted in FIG. 1c.

According to a further embodiment, the package may apply a compressive strain instead of applying a tensile strain. The package 112 depicted in FIG. 1c, constricts about the FBG 104 during fabrication. This results in a shift in the FBG resonance toward shorter wavelengths. As in the aforementioned tensile design, the package is insoluble in water but soluble in hydrocarbon-based solvents. Such a constricting package can, for example, be thermally formed polystyrene or rubber-based heat-shrink tubing. The compressive strain is applied by the thermal formation of the package, and exposure to hydrocarbons releases the compressive strain.

Figure 1E:
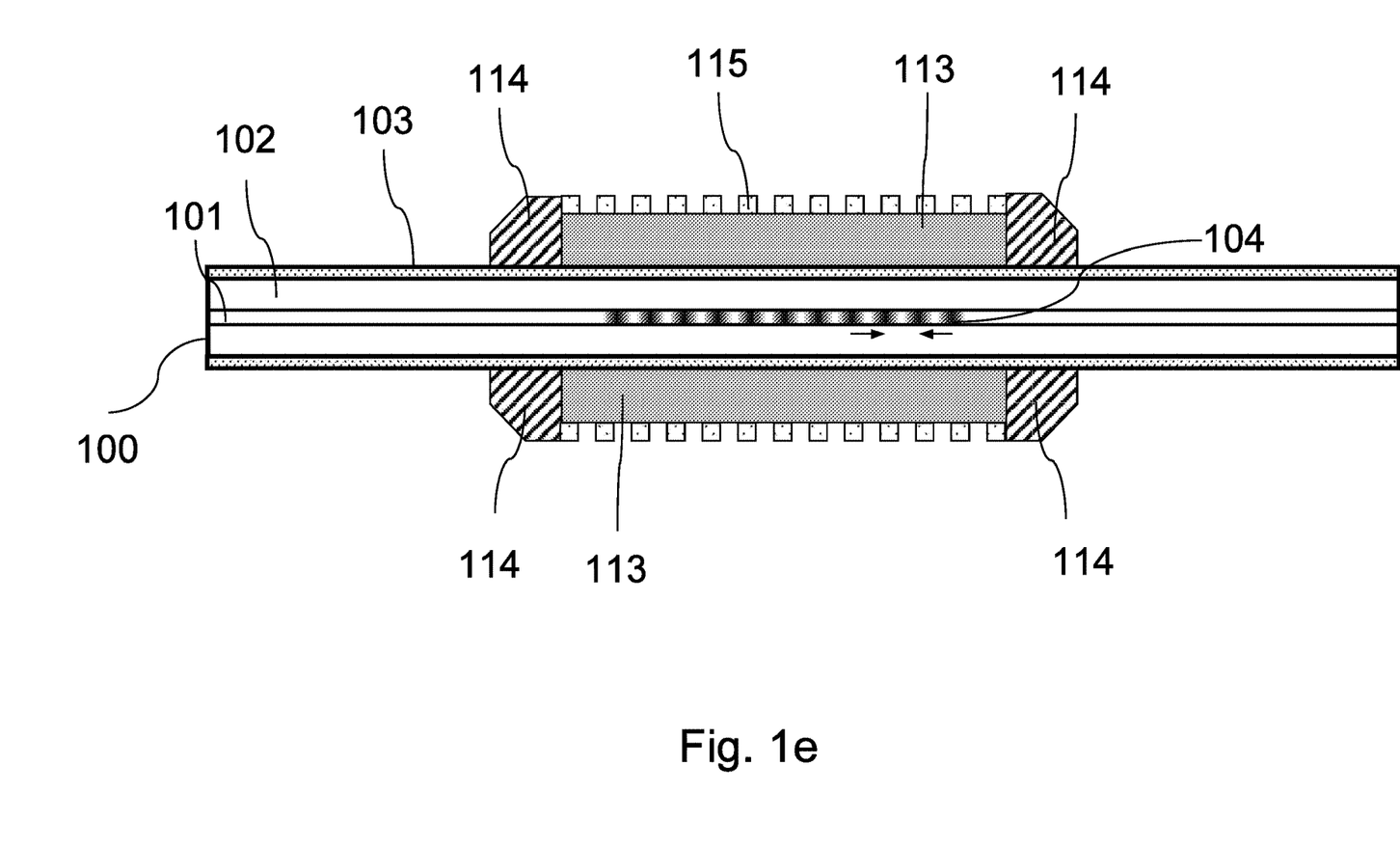
FIG. 1e is a schematic illustration of yet a further alternative exemplary Bragg fiber grating sensor packaged without any initial strain, wherein the package is capable of reacting to oil but not to water such that, upon exposure to oil, the package applies a detectable strain to the grating.

In FIG. 1e, the package has portions 114 that are bonded or crimped to the fiber coating 103 beyond the location of the FBG. The anchors 114 may be surrounded by an optional perforated membrane cylinder 115. The region between the membrane and the fiber coating is filled with a material 113 that swells or hardens when exposed to oil (ex. polyolefin or petrogel). Without exposure to a hydrocarbon, the FBG sensor is not subjected to any strain. The perforated cylinder 115 and anchors 114 constrain the swelling material 113 such that it applies a tensile strain to the fiber grating which results in a variation in the sensor's wavelength.

Depending on the initial thickness of the swelling material surrounding the fiber, for example ethylene propylene diene monomer rubber (EPDM), and the adhesive strength of the anchors to the fiber, sufficient tensile strain can be applied such that the fiber will reach its breakage point, creating an optical 'fuse'. Using an OTDR, the location of the breakage point in the fiber can be determined.

The breakage strength of the fiber with grating can be controlled by the laser exposure conditions used to fabricate the Bragg grating. Gratings written through polymer coatings of the fiber that in the Type I regime can withstand tensile strain levels up to that of the pristine optical fiber. By increasing the intensity such that Type II gratings are formed, the breakage strength can be reduced up to a factor of 5. By controlling the exposure conditions, beam intensity and number of superimposed laser pulses during FBG inscription, the resultant breakage strength of the fiber can be accurately controlled.

It is possible that the material 113 upon exposure to hydrocarbon-based solvents such as oil will constrict thus applying a compressive strain. This would be advantageous if an optical fuse is not desired as optical fibers can withstand much higher compressive strains when compared with tensile strains.

An important common factor of each embodiment shown in FIGS. 1a to 1e, is that strain is either released or applied to the FBG as a result of interaction of the package with a chemical to be detected. As discussed above, the strain can be but is not limited to tension, compression, torsion, shear, bending etc.

Figure 2A:
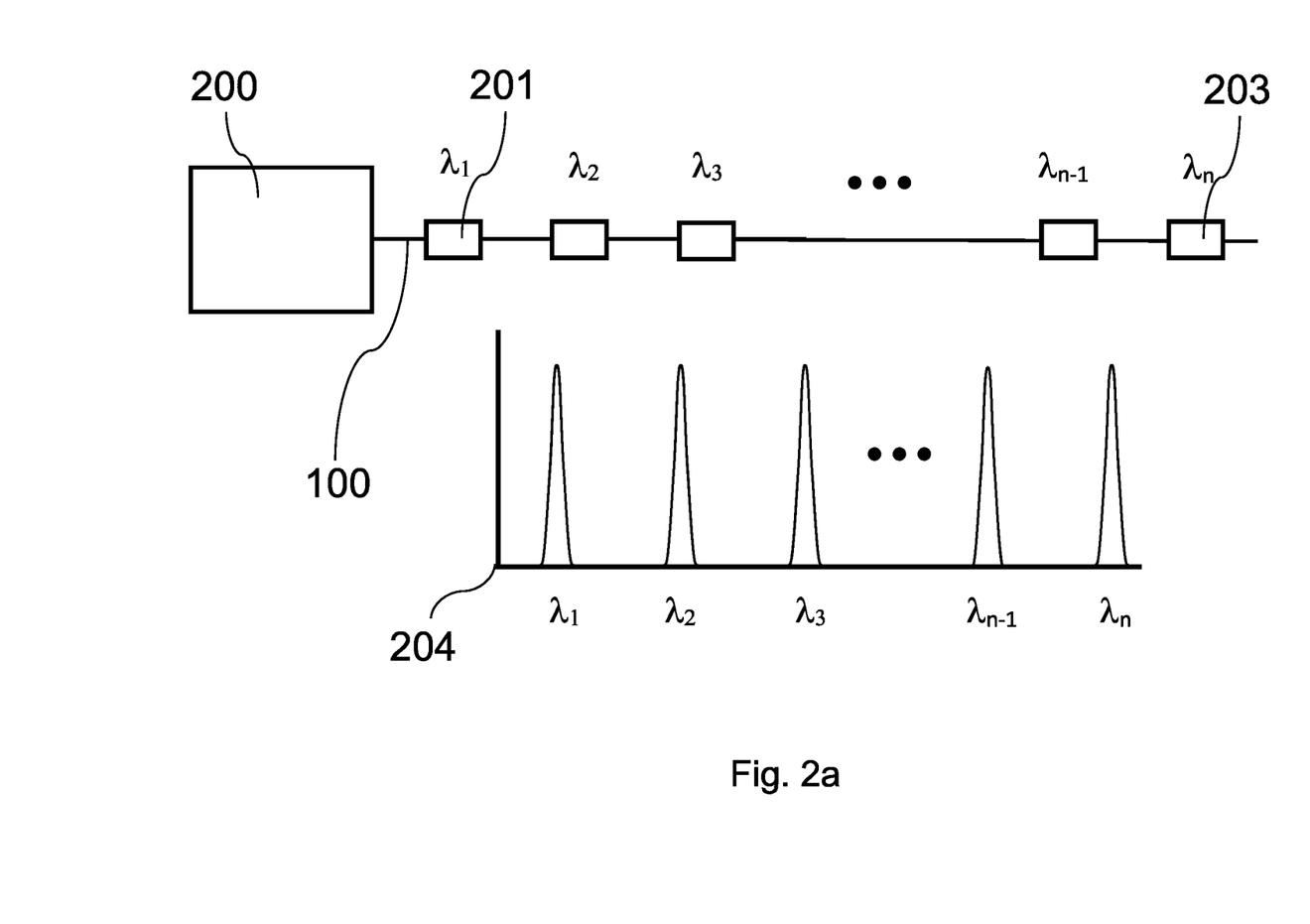
FIG. 2a shows a WDM based sensing system comprising an FBG interrogator and a distributed sensor array with individual FBG elements packaged, in accordance with an embodiment.
Figure 2B:
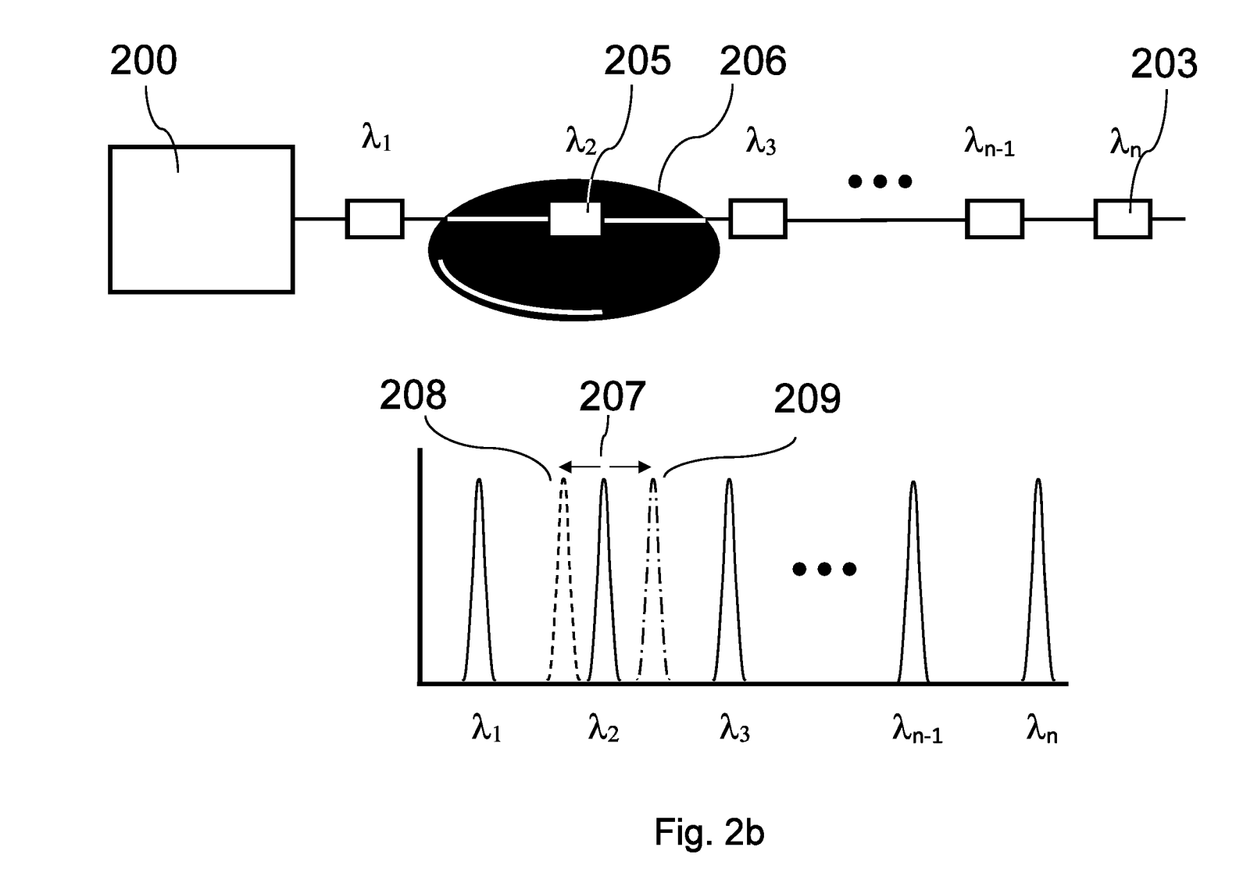
FIG. 2b shows a WDM based sensing system including an array of FBG sensors for detecting an oil spill when the spill results in either a release or application of strain to at least one sensor, in accordance with an embodiment.

FIG. 2a illustrates a system for detecting presence of a fluid, such as an oil leak using the sensors discussed above with reference to FIGS. 1a to 1e. In the system of FIG. 2a, an optical source/detector system or fiber Bragg grating interrogator 200, such as the SM125 Optical Sensing Interrogator from Micron Optics, Atlanta, Ga., interrogates a fiber Bragg grating array, which is comprised of an optical fiber 100 and a series of n fiber grating sensor elements, with a first element 201 having a resonant wavelength $\lambda 1$ and a last sensing element 203 having a resonant wavelength $\lambda_n$. All gratings have reflectivities >25% in order to enhance the signal to noise ratio of the detection. Each grating element is packaged under strain, as discussed above, for producing a reflection spectrum 204 of reflected intensity versus wavelength at the interrogator 200. FIG. 2b depicts an example of a Bragg resonance shift when packaged grating element 205 having a Bragg resonance at $\lambda 2$, is exposed to an oil leak 206. For the case of the packages denoted in FIGS. 1a and 1b, volatile organics in the oil dissolve the adhesive bonds of the package that locally apply strain to the grating element 205. With the adhesive dissolved, the strain on the grating 205 is released resulting in a shifting of the Bragg resonance $\lambda 2$, 207, to a shorter wavelength 208. With specific Bragg resonances correlated with specific positions along the length of the fiber, the leak 206 can be localized. By packaging individual sensors in athermal packages, such as the package of FIG. 1b, wavelength shifts due to temperature variations are minimized. For the case of the packages illustrated in FIGS. 1c and 1d, which apply a compressive strain to the FBG, the volatile organics in the fluid leak 206 dissolve the constraining package resulting in a release of the compressive strain and shift to higher wavelengths 209 of the grating element 205.

Figure 3A:
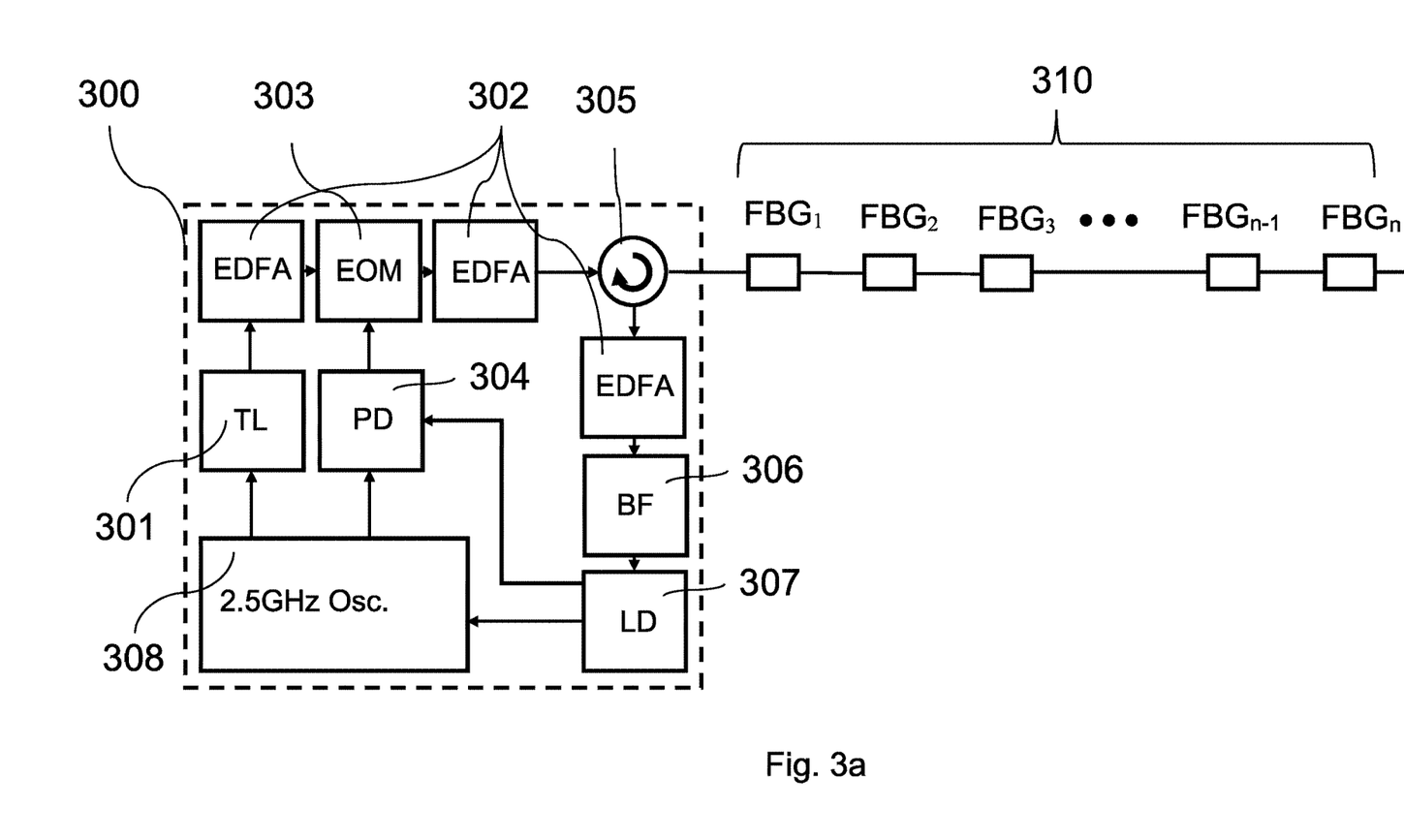
FIG. 3a shows a TDM based sensing system comprising an FBG interrogator and a distributed sensor array with individual FBG elements packaged, in accordance with an embodiment.

Alternatively, the interrogation system can be based on a WSTDM approach, as taught by Bo Dong et al. in U.S. Pat. No. 9,677,957. In this case, each of the FBG sensing elements, instead of having a unique Bragg resonance, has an identical Bragg resonance and reflectivity less than 0.1%. In FIG. 3a, the WSTDM 300 comprises a continuous wave tunable laser 301, three fiber amplifiers 302, an electro-optic modulator 303, a pulse driver 304, an optical circulator 305, a bandpass filter 306, a lightwave detector 307, and a computer oscilloscope 308. Light from the tunable laser 301 is amplified by the first fiber amplifier 302 and then launched in the electro-optic modulator 303 to produce an optical pulse with a desired pulse duration and repetition rate. To compensate for the high loss of electro-optic modulator 303, the output optical signal is further amplified by the second fiber amplifier 302 before being passed through the optical circulator 305 and launched into the array of weak FBGs with identical wavelength 310. The incident pulse is partially reflected by each of the serial FBGs. The magnitude of the pulse reflected by an FBG is determined by the pulse wavelength and the FBG reflection spectrum. The successive pulses reflected by the FBG array are amplified by the third fiber amplifier 302, and bandpass filter 306 is used to suppress amplified spontaneous emission from the three fiber amplifiers before the signal is detected by the lightwave detector 307. This process is repeated for each wavelength increment of the tunable laser that is needed to scan the spectral range where an FBG reflection may appear. The oscilloscope 308 then measures the time of light of the returning pulses.

Figure 3B:
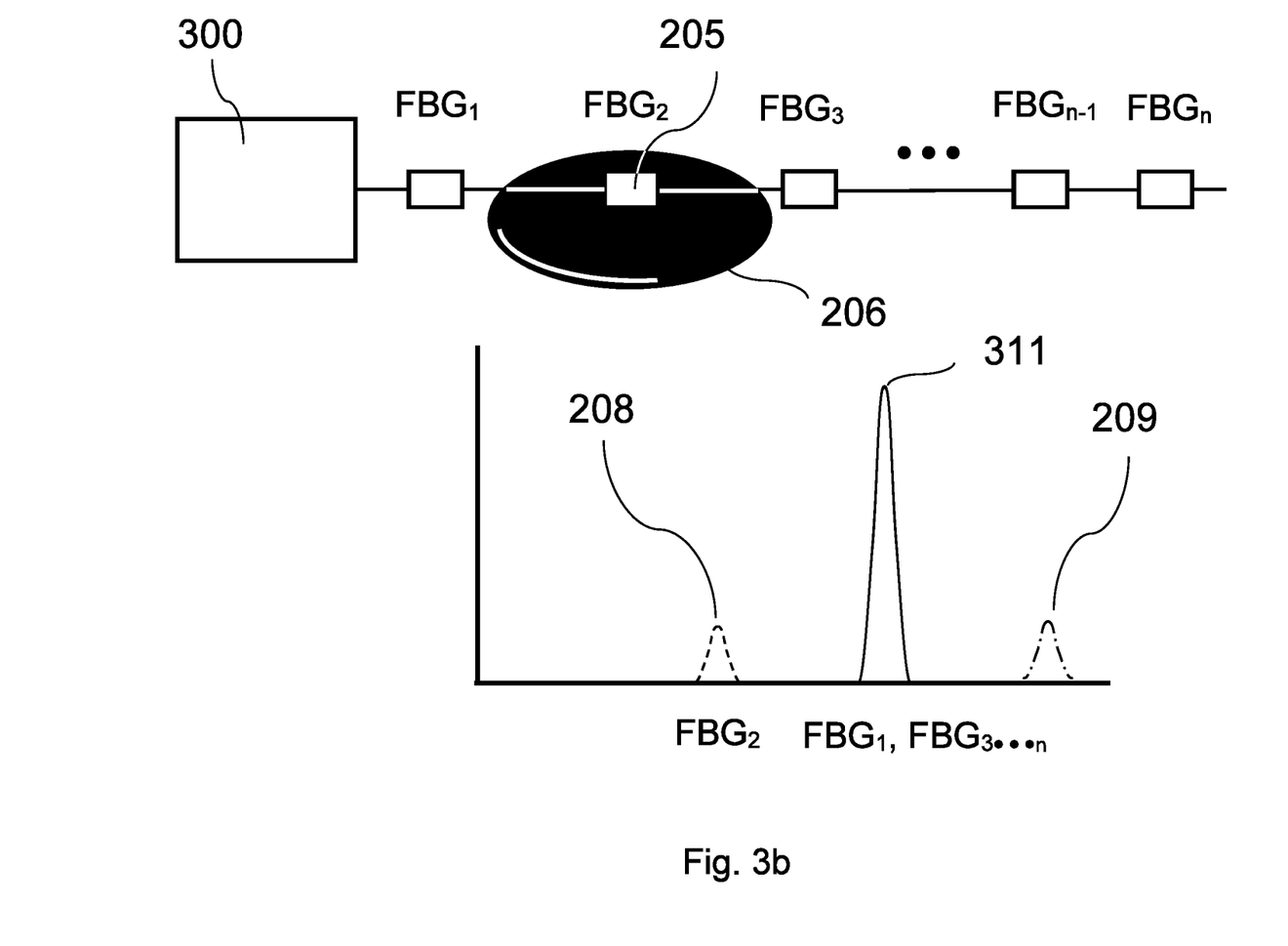
FIG. 3b shows a TDM based sensing system including an array of FBG sensors for detecting an oil spill when the spill results in either a release or application of strain to at least one sensor, in accordance with an embodiment.

FIG. 3b shows detection of an event when the wavelength of a single device 205 shifts away from the nominal same resonant wavelength 311 of the remaining FBGs. These same wavelength resonance values of the remaining FBGs can be distributed about the nominal wavelength value 311 differing in resonance values from 0.001 nm to 10 nm. Identification of the individual sensor that is tripped by the leak is determined by the time of flight of the pulse having the resonant wavelength of the tripped FBG sensor. If the sensor is packaged under tension, Bragg resonance of the sensing element 205 shifts to the lower wavelength 208. Alternatively, if the sensor is packaged under compression, resonance of the sensing element 205 shifts to higher wavelengths 209. If the sensors are packaged with anchors as depicted in FIG. 1e) and all the Bragg resonances are contained in a defined wavelength range 311, then when one sensor is activated by the fluid, the package will determine the magnitude of the wavelength shift beyond the said wavelength range where all the other wavelengths are confined. The new resonance wavelength is then determined by the FBG interrogator and the position determined by the time of flight measurement of an interrogating laser pulse.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method for detecting presence of a fluid, comprising:
   mounting a sensor array proximate a conduit for said fluid, said sensor array comprising a plurality of Bragg grating sensing elements within an optical waveguide, each Bragg grating sensing element being encapsulated in a package for subjecting the Bragg grating sensing element to a change in strain when contacted by said fluid; and
   interrogating said sensor array with laser light to detect any change in the optical properties of the Bragg grating sensing elements due to the change in strain, wherein said package encapsulates the Bragg grating sensing element under an initial strain and decreases the strain to which the Bragg grating sensing element is subjected when contacted by said fluid.

2. The method of claim 1, wherein the strain is one of either compression or tension.

3. The method of claim 1, wherein the sensor array is interrogated using at least one of wavelength division multiplexing or time division multiplexing.

4. The method of claim 1, wherein the change in strain comprises a change in one of either tension, compression, torsion, shear or bending.

\* \* \* \* \*